(12) United States Patent
Kim

(10) Patent No.: US 8,665,395 B2
(45) Date of Patent: Mar. 4, 2014

(54) LIQUID CRYSTAL DISPLAY DEVICE AND METHOD OF MANUFACTURING THE SAME

(75) Inventor: Do-Hyun Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 244 days.

(21) Appl. No.: 13/092,561

(22) Filed: Apr. 22, 2011

(65) Prior Publication Data

US 2011/0261287 A1    Oct. 27, 2011

(30) Foreign Application Priority Data

Apr. 23, 2010   (KR) ...................... 10-2010-0038098

(51) Int. Cl.
*G02F 1/1335*    (2006.01)
(52) U.S. Cl.
USPC ............................................... 349/61
(58) Field of Classification Search
None
See application file for complete search history.

(56) References Cited

U.S. PATENT DOCUMENTS

| | | | | |
|---|---|---|---|---|
| 5,514,850 | A * | 5/1996 | Miyazaki et al. | 219/121.69 |
| 2007/0035830 | A1 | 2/2007 | Matveev et al. | |
| 2007/0126945 | A1 * | 6/2007 | Tashiro | 349/54 |
| 2009/0148664 | A1 * | 6/2009 | Yoshizawa | 428/156 |
| 2011/0159227 | A1 * | 6/2011 | Yoshizawa | 428/63 |
| 2012/0327345 | A1 * | 12/2012 | Inoue et al. | 349/123 |

FOREIGN PATENT DOCUMENTS

| | | |
|---|---|---|
| JP | 06-016440 A | 1/1994 |
| JP | 2007-322762 A | 12/2007 |
| JP | 2009-084120 A2 | 4/2009 |
| KR | 10-2001-0016814 A | 3/2001 |
| KR | 10-2007-0065618 A | 6/2007 |
| KR | 10-2008-0077442 A | 8/2008 |
| KR | 10-2008-0081468 A | 9/2008 |
| KR | 10 2008-0081468 A | 9/2008 |

OTHER PUBLICATIONS

Korean Notice of Allowance in KR 10-2010-0038098, dated May 23, 2012 (Kim).
Office Action issued in corresponding Korean application, 10-2010-0038098, dated Jul. 22, 2011.

* cited by examiner

*Primary Examiner* — Sung Pak
(74) *Attorney, Agent, or Firm* — Lee & Morse, P.C.

(57) ABSTRACT

A liquid crystal display device and a method of manufacturing the same, the device including a liquid crystal display panel, the liquid crystal display panel including substrates facing each other and a liquid crystal layer therebetween; a backlight unit below the liquid crystal display panel, the backlight unit being for emitting light toward the liquid crystal display panel; a filling that fills defect holes on surfaces of the substrates, which surfaces are relatively remote from the liquid crystal layer, the filling having horizontally even surfaces with respect to the surfaces of the substrates, and a cover member disposed over the defect holes filled with the filling.

18 Claims, 6 Drawing Sheets

LIQUID CRYSTAL DISPLAY DEVICE AND METHOD OF MANUFACTURING THE SAME

BACKGROUND

1. Field

Embodiments relate to a liquid crystal display device and a method of manufacturing the same.

2. Description of the Related Art

Generally, a liquid crystal display panel is a light receiving type display device that forms an image with external light incident thereon.

Since a liquid crystal display panel cannot emit light by itself, a backlight unit may be installed behind the liquid crystal display panel and may irradiate light toward the panel. Therefore, an image may be viewed even in a dark location. A backlight unit may also be used as a surface light source device, e.g., an illuminated signboard.

A liquid crystal display panel may include liquid crystal between two substrates. When power is supplied, the liquid crystal display panel may display, e.g., images, numbers, and texts, by rearranging liquid crystal molecules. Liquid crystal display panels may be categorized into various types based on driving mechanisms, displaying mechanisms, and display arrangements. A thin-film transistor (TFT) type liquid crystal display panel may refer to a panel in which transistors are uniformly arranged in each pixel on a substrate.

Recently, in order to miniaturize a liquid crystal display panel, thicknesses of the substrates have been further reduced. However, if each function layer is formed on the substrates after the thicknesses of the substrates are reduced, the substrates with reduced thicknesses may be undesirably damaged or deformed. In addition, patterns of each of the function layers may become defective during fabrication of each of the function layers, e.g., by a baking process at a high temperature.

Therefore, thicknesses of the substrates may be reduced by forming each of the function layers on the substrates and then etching the substrates. However, if the substrates are etched by using a conventional etching solution, it may be difficult to control formation of defect holes in the substrates.

For example, depths of defect holes in a substrate may be about 10 micrometers to about 50 micrometers. It may be possible to reduce sizes of defect holes by polishing and removing about 5 to about 10 micrometers from an etched substrate.

However, there is a limit to reducing the polished thickness of an etched substrate when the etched substrate is polished by using a polisher. Therefore, defect holes may remain in the substrate.

Especially, in mass production, defect holes may be scattered throughout a plurality of substrates, and thus it is difficult to select substrates to be polished.

Furthermore, even if sizes of defect holes are reduced by polishing substrates, the probability that the polished substrate is determined to be good is below 70%. Furthermore, compared to the recent trend of reducing a thickness of a substrate, sizes of defect holes are increasing. Therefore, the probability of defects further increases.

SUMMARY

Embodiments are directed to a liquid crystal display device and a method of manufacturing the same, which represents advances over the related art.

It is a feature of an embodiment to provide a liquid crystal display device in which diffused-reflection is reduced by filling defect holes on a substrate with a filling.

At least one of the above and other features and advantages may be realized by providing a liquid crystal display device including a liquid crystal display panel, the liquid crystal display panel including substrates facing each other and a liquid crystal layer therebetween; a backlight unit below the liquid crystal display panel, the backlight unit being for emitting light toward the liquid crystal display panel; a filling that fills defect holes on surfaces of the substrates, which surfaces are relatively remote from the liquid crystal layer, the filling having horizontally even surfaces with respect to the surfaces of the substrates, and a cover member disposed over the defect holes filled with the filling.

A refractive index of the filling may be about 90% to about 110% of a refractive index of each of the substrates.

The filling may be a hardened acrylic filling.

The filling may be gaseous.

The gaseous filling may include carbon dioxide gas.

The cover member may include a polarization film coupled to the substrates via an adhesive.

At least one of the above and other features and advantages may also be realized by providing a method of manufacturing a liquid crystal display device including a liquid crystal layer between a pair of substrates, the method including filling defect holes on surfaces of the substrates with a liquid filling, which surfaces are relatively remote from the liquid crystal layer; and hardening the liquid filling to create horizontally even surfaces thereof with respect to the surfaces of the substrates.

Filling the defect holes may include filling the defect holes with a liquid acrylic raw material by using a squeegee; and hardening the liquid acrylic raw material may include irradiating an ultraviolet ray thereto.

Filling the defect holes may include injecting a liquid acrylic raw material into the defect holes by using a dispenser with a diameter smaller than diameters of the defect holes; and hardening the liquid filling may include hardening the acrylic raw material.

The method may further include polishing the hardened acrylic filling.

A refractive index of the liquid filling may be about 90% to about 110% of a refractive index of each of the substrates The method may further include coupling a polarization film to the substrates having the filled defect holes via an adhesive.

At least one of the above and other features and advantages may also be realized by providing a method of manufacturing a liquid crystal display device including a liquid crystal layer between a pair of substrates, the method including filling defect holes on surfaces of the substrates with a gaseous filling, which surfaces are relatively remote from the liquid crystal layer; and coupling a cover member to the substrate over the filled defect holes.

Filling the defect holes on the substrates may include placing the substrates in a process chamber including the gaseous filling.

A refractive index of the gaseous filling may be about 90% to about 110% of a refractive index of each of the substrates.

The gaseous filling may include carbon dioxide gas.

The cover member may include a polarization film and coupling the polarization film to the substrate may include coupling with an adhesive.

BRIEF DESCRIPTION OF THE DRAWINGS

The above and other features and advantages will become more apparent to those of ordinary skill in the art by describing in detail exemplary embodiments with reference to the attached drawings, in which:

FIG. 4A illustrates a state when a substrate shown in FIG. 2 is filled with the liquid filling, and FIG. 4B illustrates a state after a cover member is attached to defect holes shown in FIG. 4A;

FIG. 5A illustrates a state when the substrate shown in FIG. 2 is filled with the liquid filling, and FIG. 5B illustrates a state after a cover member is attached to defect holes shown in FIG. 5A; FIG. 6A illustrates a state when the substrate shown in FIG. 2 is filled with the gaseous filling, and FIG. 6B illustrates a state after a cover member is attached to defect holes shown in FIG. 6A.

DETAILED DESCRIPTION

Figure 1:
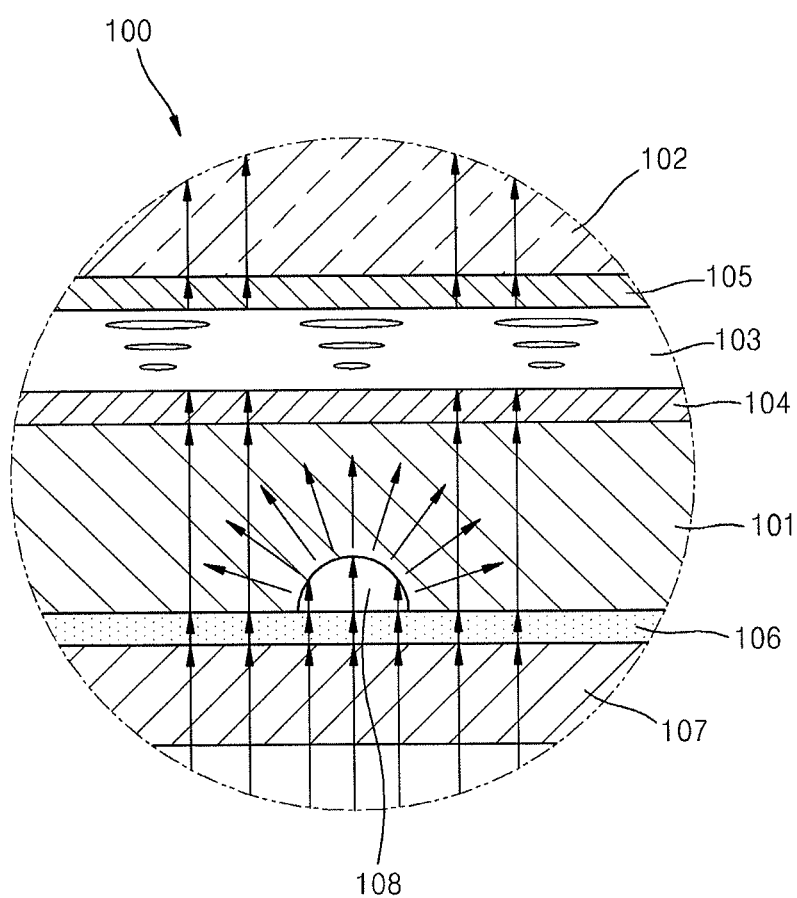
FIG. 1 illustrates a diagram of a liquid crystal display panel.

Korean Patent Application No. 10-2010-0038098, filed on Apr. 23, 2010, in the Korean Intellectual Property Office, and entitled: "Liquid Crystal Display Device and Method of Manufacturing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout FIG. 1 illustrates a diagram of a liquid crystal display panel 100.

Referring to FIG. 1, the liquid crystal display panel 100 may include a first substrate 101, a second substrate 102, a liquid crystal layer 103 between the first substrate 101 and the second substrate 102, a first function layer 104 on a top surface of the first substrate 101, a second function layer 105 on a bottom surface of the second substrate 102, a first polarization film 107 coupled to an outer surface of the first substrate 101 via an adhesive 106, and a second polarization film (not illustrated) on an outer surface of the second substrate 102.

In the liquid crystal display panel 100 having the configuration as stated above, thicknesses of the first substrate 101 and the second substrate 102 may be reduced by etching the first substrate 101 and the second substrate 102 and respectively patterning the first function layer 104 and the second function layer 105 on the first substrate 101 and the second substrate 102.

Here, a plurality of dimple type defect holes 108 may be formed in the first substrate 101 or the second substrate 102 either while the first substrate 101 or the second substrate 102 are being prepared or while the first function layer 104 and the second function layer 104 are being formed.

When the defect holes 108 are formed, light emitted by a backlight unit may be diffused-reflected by the first substrate 101 and/or the second substrate 102, according to which substrate includes the defect holes 108. When the liquid crystal display panel 100 is viewed by a viewer, any diffused-reflection may be a defect that may be recognized by the viewer.

Therefore, it may be desirable to reduce diffused-reflection of light due to the defect holes 108 by reducing sizes of the defect holes 108. The defect holes 108 may be reduced by, e.g., polishing etched surfaces of the first substrate 101 and/or the second substrate 102 or filling in the defect holes 108.

Figure 2:
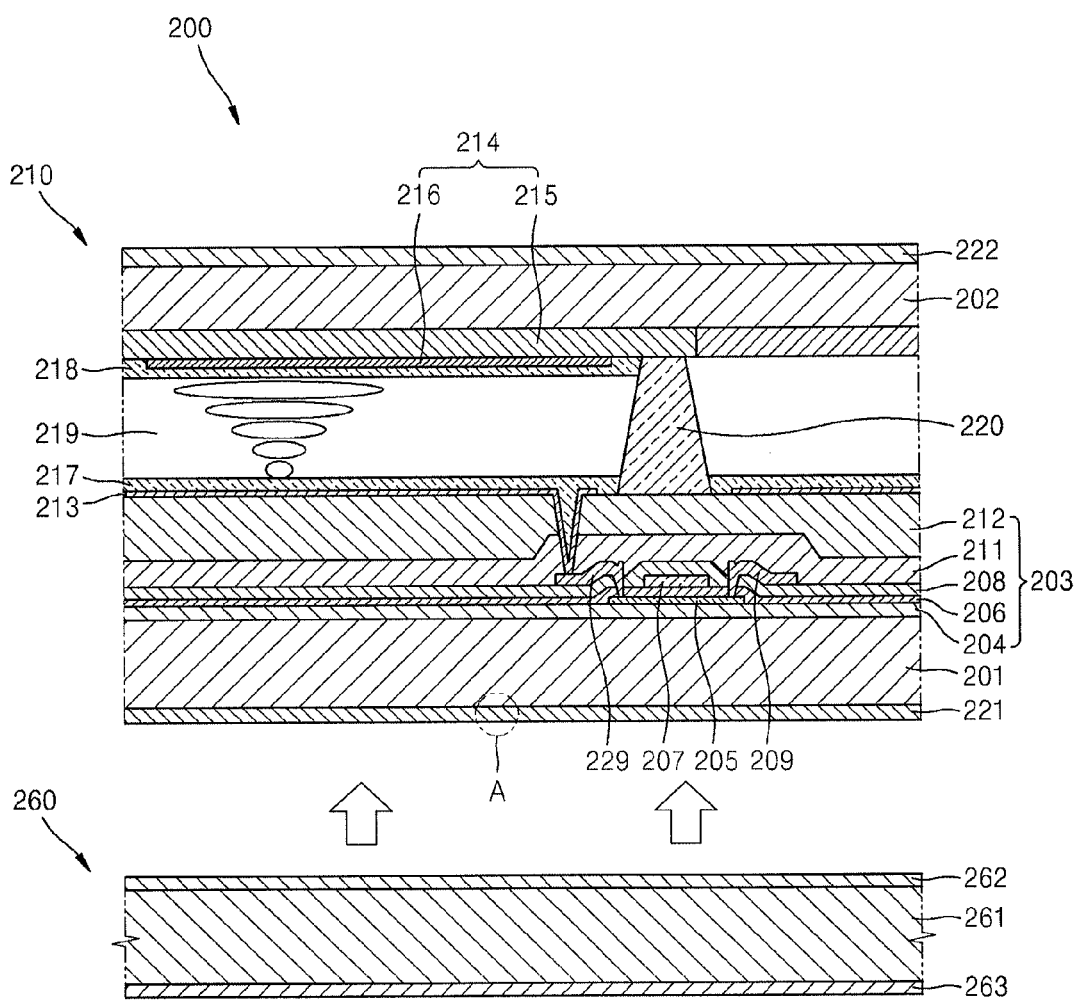
FIG. 2 illustrates a diagram of a liquid crystal display device according to an embodiment.

FIG. 2 illustrates a diagram of a liquid crystal display device 200 according to an embodiment.

Referring to FIG. 2, the liquid crystal display device 200 may include a liquid crystal display panel 210 and a backlight unit 260 that emits light toward the liquid crystal display panel 210.

The liquid crystal display panel 210 may include a first substrate 201 and a second substrate 202 facing the first substrate 201. The first substrate 201 and the second substrate 202 may be transparent substrates, e.g., transparent glass substrates formed of soda lime glass or transparent plastic substrates.

A first function layer 203 may be formed on the first substrate 201. In an implementation, the first function layer 203 may be a thin film transistor TFT.

In particular, a buffer layer 204 may be formed on a top surface of the first substrate 201. The buffer layer 204 may secure planarity of the first substrate 201 and may prevent leakage of impurity atoms. The buffer layer 204 may be formed of, e.g., $SiO_2$ and/or $SiN_x$.

A semiconductor active layer 205 may be formed on the buffer layer 204 in a predetermined pattern. A gate insulation layer 206 may be formed on the semiconductor active layer 205 and a gate electrode 207 may be formed on the gate insulation layer 206 in a predetermined pattern. An interlayer insulation layer 208 may be formed on the gate electrode 207 to cover the gate electrode 207.

After the interlayer insulation layer 208 is formed, the gate insulation layer 206 and the interlayer insulation layer 208 may be etched to form a contact hole in which a portion of the semiconductor active layer 205 is exposed. A source electrode 209 and a drain electrode 229 may be formed to be electrically connected to the semiconductor active layer 205 via the contact hole.

The source electrode 209 and the drain electrode 229 may be covered by a passivation film 211. A flattening film 212 may be formed on the passivation film 211. The passivation film 211 and the flattening film 212 may be etched to form a contact hole for a first electrode 213 in a predetermined pattern, to electrically connect the first electrode 213 to the source electrode 209 or the drain electrode 229.

A second function layer 214 may be formed on a bottom surface of the second substrate 202.

In particular, a color filter layer 215 may be formed on the bottom surface of the second substrate 202. A second electrode 216 may be formed on a bottom surface of the color filter layer 215.

A first liquid crystal alignment layer 217 may be formed on the first electrode 213; and a second liquid crystal alignment layer 218 may be formed on a bottom surface of the second electrode 216. A liquid crystal layer 219 may be formed between the first liquid crystal alignment layer 217 and the second liquid crystal alignment layer 218. A spacer 220 that defines the liquid crystal layer 219 may be formed between the color filter layer 215 and the flattening film 212.

A first polarization film 221 may be formed on an outer or bottom surface of the first substrate 201. A second polarization film 222 may be formed on an outer or top surface of the second substrate 202.

The backlight unit 260, which emits light, may be installed behind the liquid crystal display panel 210.

The backlight unit 260 may include a light source device (not illustrated) and a light guiding plate 261 that guides light supplied by the light source device to the liquid crystal display panel 210.

The light guiding plate 261 may have a particular pattern to provide light uniformly. For example, the light guiding plate 261 may include a transparent acrylic resin and a plurality of light guiding pattern units may be printed on the acrylic resin by using, e.g., bead-type titanium oxide and an ink containing glass or acryl, so as to diffuse and scatter light incident via a surface of the transparent acrylic resin.

The light guiding pattern units may be formed not only by using the aforementioned printing method, but also by using a non-printing method, e.g., a stamping method using a mold or an injection molding method. Preferably, the light guiding pattern units are formed by processing an acrylic resin by using a laser beam to form a sectional sawtooth-type structure. A fine sawtooth-type structure may function as microlenses, and thus diffusion of light towards various angles may be increased.

The light guiding pattern units may have a shape of, e.g., a dot that includes a groove with a predetermined depth, a rectangle, a lattice, a combination thereof, a dotted line that includes intermittently formed grooves with a predetermined depth, or a straight line that includes successively formed grooves. Furthermore, sizes of grooves of the light guiding pattern units may gradually increase or a pitch of the grooves of the light guiding pattern units may gradually decrease as a distance to the light source device increases, so as to improve light diffusion and a scattering ratio.

An optical sheet 262 may be interposed between the liquid crystal display panel 210 and the light guiding plate 261. The optical sheet 262 may include at least one sheet, e.g., may include a diffusion sheet and/or a prism sheet, and may diffuse or concentrate light guided by the light guiding plate 261, so that light may be more uniformly incident on the liquid crystal display panel 210.

A reflective sheet 263 may be installed on a rear surface of the light guiding plate 261, i.e., on a side opposite to the side having the optical sheet 262. The reflective sheet 263 may reflect light passing through the rear surface of the light guiding plate 261 back toward the liquid crystal display panel 210 so as to improve overall efficiency of light.

Although not illustrated, the light source device may include, e.g., a cold-cathode fluorescent lamp, an external electrode fluorescent lamp, or a light emitting diode, and more preferably, the light source device may include a plurality of white light emitting diodes.

Here, defect holes 321 (see FIG. 3) may be formed on the outer surface of the first substrate 201 or on the outer surface of the second substrate 202, i.e., surfaces located relatively far from the liquid crystal layer 219, during preparation of raw materials or when forming the first function layer 203 and/or the second function layer 214. However, the defect holes 321 may be filled with a filling 331.

Detailed descriptions thereof will be given below.

Figure 3:
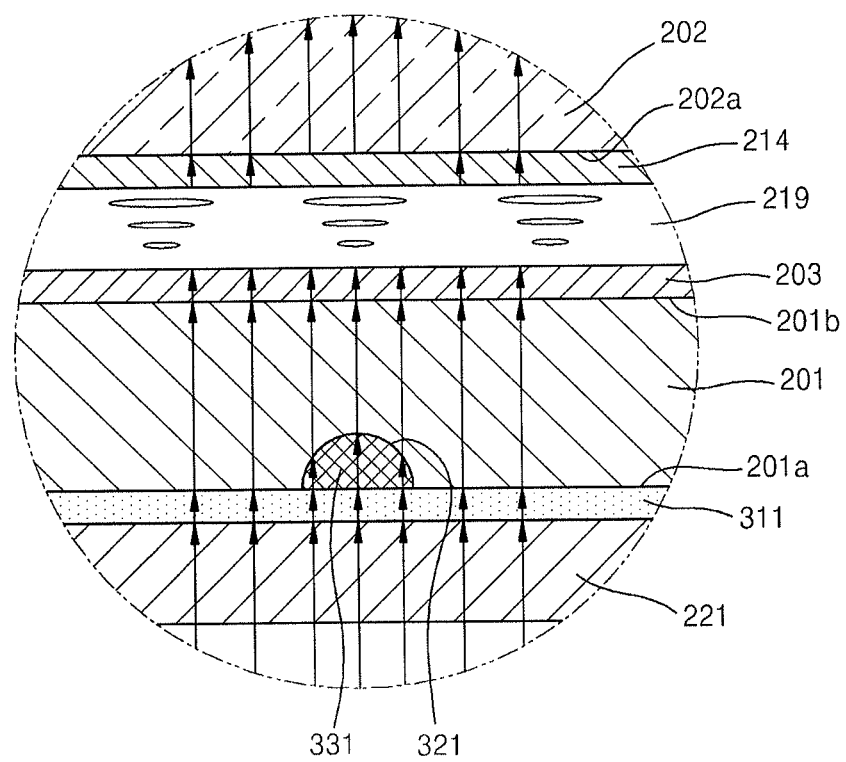
FIG. 3 illustrates a diagram showing a portion A of FIG. 2 in closer detail.

FIG. 3 illustrates a diagram showing a portion A of FIG. 2 in closer detail.

Hereinafter, descriptions of filling the defect holes 321 on the outer surface of the first substrate 201 will be given below. However, the description may also be applied to defect holes 321 on the outer surface of the second substrate 202 and corresponding structures will have similar or identical functions.

Referring to FIG. 3, a first polarization film 221 may be attached to a first surface 201a of the first substrate 201 via an adhesive 311. The first surface 201a may be a surface through which light emitted by the backlight unit 260 (refer to FIG. 2) is incident. The first function layer 203 may be formed on a surface of the first substrate 201 opposite to the first surface 201a, i.e., a second surface 201b of the first substrate 201.

As illustrated in FIG. 2, the first function layer 203 may include, e.g., the buffer layer 204, the semiconductor active layer 205, the gate insulation layer 206, the gate electrode 207, the interlayer insulation layer 208, the source electrode 209, the drain electrode 229, the passivation film 211, the flattening film 212, the first electrode 213, and the first liquid crystal alignment layer 217.

The second function layer 214 may be formed on a first surface 202a of the second substrate 202, i.e., a surface of the second substrate 202 facing the first function layer 203. As illustrated in FIG. 2, the second function layer 214 may include, e.g., the color filter layer 215, the second electrode 216, and the second liquid crystal alignment layer 218.

The liquid crystal layer 219 may be formed between the first substrate 201 and the second substrate 202.

The, e.g., dimple-type, defect holes 321 may occur on the first surface 201a of the first substrate 201, which may contact an etching solution during, e.g., an etching operation performed for reducing a thickness of the first substrate 201 or during formation of the first function layer 203.

If the liquid crystal display device 200 including the defect holes 321 is viewed, light may be diffused-reflected in portions in which the defect holes 321 are formed. Thus, visibility of the liquid crystal display device 200 may be deteriorated.

To prevent deterioration of visibility, the defect holes 321 may be filled with the filling 331. In other words, the filling 331 may fill the defect holes 321 on the first surface 201a of the first substrate 201, which may be located relatively far from the liquid crystal layer 219.

When the filling 331 fills the defect holes 321, the filling 331 may have horizontally even surfaces with respect to the first surface 201a of the first substrate 201. In other words, a surface of the filling 331 may be coplanar with the first surface 201a of the first substrate 201 (and/or a surface of the second substrate 202). The filling 331 may be formed of, e.g., a liquid material, a gaseous material, or a solid material.

When using a liquid material, an, e.g., acrylic material, may be used as the filling 331. When using a gaseous material, the filling 331 may include a gas or a mixture of more than one gas including, e.g., carbon dioxide ($CO_2$) gas.

Here, the filling 331 may have a refractive index that is about 90% to about 110% of a refractive index of the first substrate 201. In other words, the refractive index of the filling 331 may be very similar or about the same as the refractive index of the first substrate 201. In an implementation, the refractive index of the filling 331 may be identical to the refractive index of the first substrate 201.

For example, when the first substrate 201 is a transparent glass substrate, the refractive index of the first substrate 201 may be about 1.5. When the filling 331 used to fill the defect holes 321 is a liquid material, the refractive index of the liquid filling 331, which may be, e.g., an acrylic material, may be about 1.5, which is substantially identical to the refractive index of the first substrate 201.

Furthermore, when the filling 331 used to fill the defect holes 321 is a gaseous material, the refractive index of the gaseous filling 331, which may include, e.g., $CO_2$ gas, may be about 1.63, which is about 90% to about 110% (about 108.7%) of the refractive index of the first substrate 201.

The first polarization film 221, which may function as a cover member, may be coupled to the first surface 201a of the first substrate 201 via the adhesive 311. The defect holes 321 filled with the liquid filling 331 or the gaseous filling 331 may be covered by the first polarization film 221.

When light is emitted by the backlight unit 260, which may function as a light emitting unit, toward the liquid crystal display device 200 having the structure as described above, light propagating straight forward may pass through the first polarization film 221 and the adhesive 311 and may be incident on the first surface 201a of the first substrate 201.

At this point, if the defect holes 321 are not filled, light may be diffused-reflected in portions in which the defect holes 321 are formed. However, in the present embodiment, the defect holes 321 may be filled with the liquid filling 331 or the gaseous filling 331, the filling 331 may have horizontally even surfaces with respect to the first surface 201a of the first substrate 201, and the filling 331 may have a refractive index from about 90% to about 110% of the refractive index of the first substrate 201. Therefore, as indicated with an arrow in FIG. 3, diffused-reflection of light due to a refractive index deviation may be prevented, and thus light may propagate straight forward.

A method of manufacturing the liquid crystal display device 200 having the structure as described above will be described below with reference to FIGS. 2 and 3.

First, the first substrate 201 and the second substrate 202 may be prepared.

The first function layer 203 may be formed on the second surface 201b of the first substrate 201. As described above, the first function layer 203 may include, e.g., the buffer layer 204, the semiconductor active layer 205, the gate insulation layer 206, the gate electrode 207, the interlayer insulation layer 208, the source electrode 209, the drain electrode 229, the passivation film 211, the flattening film 212, the first electrode 213, and the first liquid crystal alignment layer 217.

The second function layer 214 may be formed on the first surface 202a of the second substrate 202, i.e., a surface of the second substrate 202 facing the first function layer 203. As described above, the second function layer 214 may include, e.g., the color filter layer 215, the second electrode 216, and the second liquid crystal alignment layer 218.

After the first function layer 203 and the second function layer 214 are formed on the first substrate 201 and the second substrate 202, respectively, the dimple-type defect holes 321, which may occur on the first surface 201a of the first substrate 201 or a surface opposite to the first surface 202a of the second substrate 202, may be filled with the filling 331. The refractive index of the filling 331 may be about 90% to about 110% of the refractive index of the first substrate 201 or the second substrate 202.

Alternatively, before the first function layer 203 and the second function layer 214 are formed on the first substrate 201 and the second substrate 202, respectively, the dimple-type defect holes 321, which may occur on the first surface 201a of the first substrate 201 or the surface opposite to the first surface 202a of the second substrate 202, may be filled with the filling 331.

Hereinafter, various methods of filling the defect holes 321 on the first surface 201a of the first substrate 201 with the filling 331 will be described. However, any of the various methods described below may also be applied to the defect holes 321 on the surface opposite to the first surface 202a of the second substrate 202 and corresponding structures may have the same or similar functions.

Figure 4A:
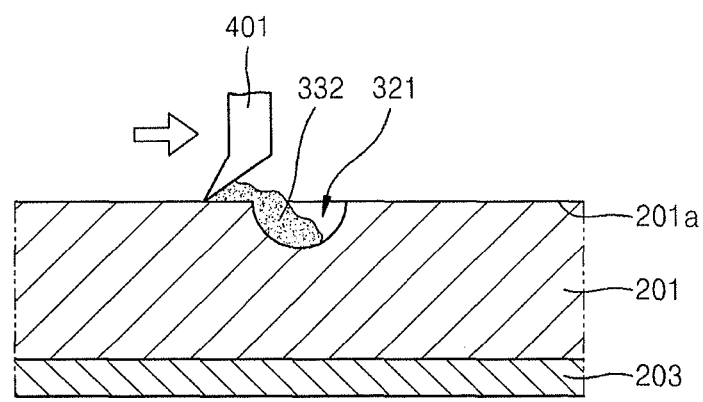
FIGS. 4A and 4B illustrate sectional views of stages in a method of using a liquid filling according to an embodiment, where

First, as illustrated in FIG. 4A, in the case where a liquid material, e.g., an acrylic raw material 332, is used to form the filling 331, the acrylic raw material 332 may be applied to the first surface 201a of the first substrate 201 by using a squeegee 401. The first surface 201a may be a surface to which light from the backlight unit 260 (refer to FIG. 2) is incident and may be a surface located far from, i.e., opposite to, the liquid crystal layer 219 (refer to FIG. 2).

At this point, although the acrylic raw material 332 may be applied to the entire first surface 201a of the first substrate 201, in an implementation, the acrylic raw material 332 may be selectively applied only to portions in which the dimple-type defect holes 321 occur. Furthermore, the acrylic raw material 332 may have a refractive index of about 1.5, which may be substantially identical to the refractive index of the first substrate 201.

Next, the acrylic raw material 332 filling the defect holes 321 may be hardened by irradiating an ultraviolet (UV) ray thereto. Then, the filling 331 (see FIG. 4B) may be polished so as to have horizontally even surfaces with respect to the first surface 201a of the first substrate 201.

Figure 4B:
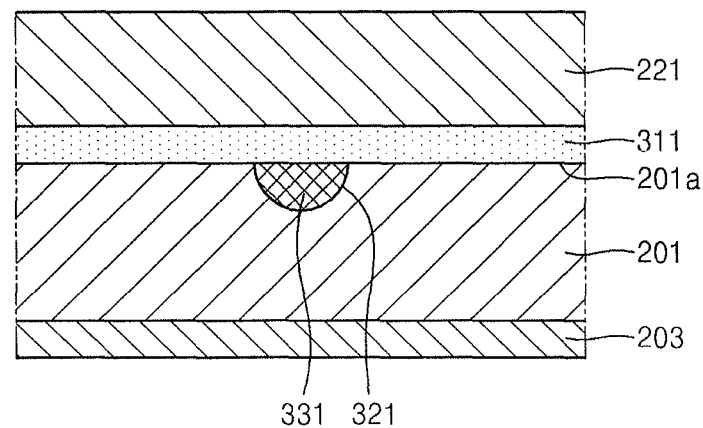

Next, as illustrated in FIG. 4B, the first polarization film 221, which may function as a cover member, may be coupled to the first surface 201a of the first substrate 201 via the adhesive 311. Therefore, the defect holes 321 filled with the filling 331 may be covered by the first polarization film 211.

Another method of forming the liquid filling 331 will be described below.

Figure 5A:
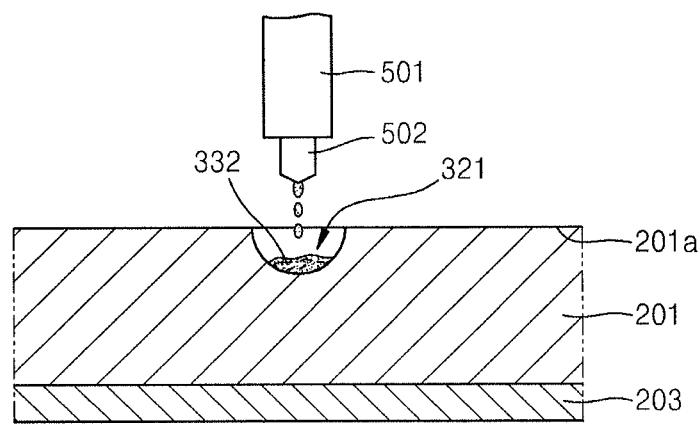
FIGS. 5A and 5B illustrate sectional views of stages in a method of using a liquid filling according to another embodiment, where

Referring to FIG. 5A, the dimple-type defect holes 321 on the first surface 201a of the first substrate 201 may be filled with the acrylic raw material 332 by injecting the acrylic raw material 332 into the defect holes 321 by using a dispenser 501.

Here, a diameter of a nozzle 502 that functions as an outlet from which the acrylic raw material 332 is ejected may be smaller than diameters of the defect holes 321 so as to selectively inject the acrylic raw material 332 into desired portions of the first surface 201a of the first substrate 201.

Therefore, the defect holes 321 may be filled with the acrylic raw material 332. Then, the acrylic raw material 332 filled in the defect holes 321 may be hardened to form the filling 331. Next, the filling 331 may be polished so as to have horizontally even surfaces with respect to the first surface 201a of the first substrate 201.

Figure 5B:
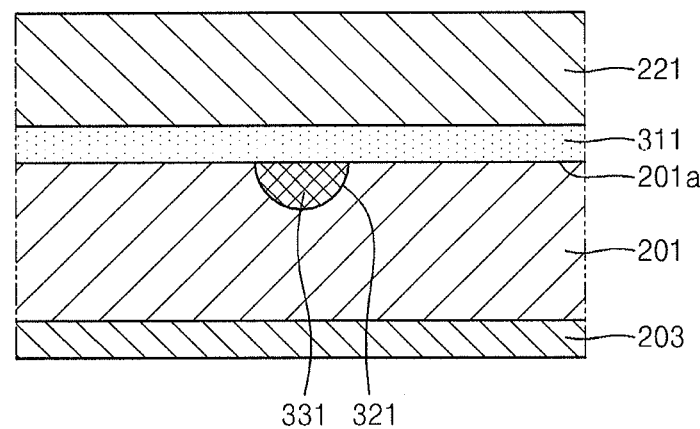

Next, as illustrated in FIG. 5B, the first polarization film 221, which may function as a cover member, may be coupled to the first surface 201a of the first substrate 201 via the adhesive 311. Therefore, the defect holes 321 filled with the hardened liquid filling 331 may be covered by the first polarization film 211.

A method of forming a gaseous filling 631 will be described below.

Figure 6A:
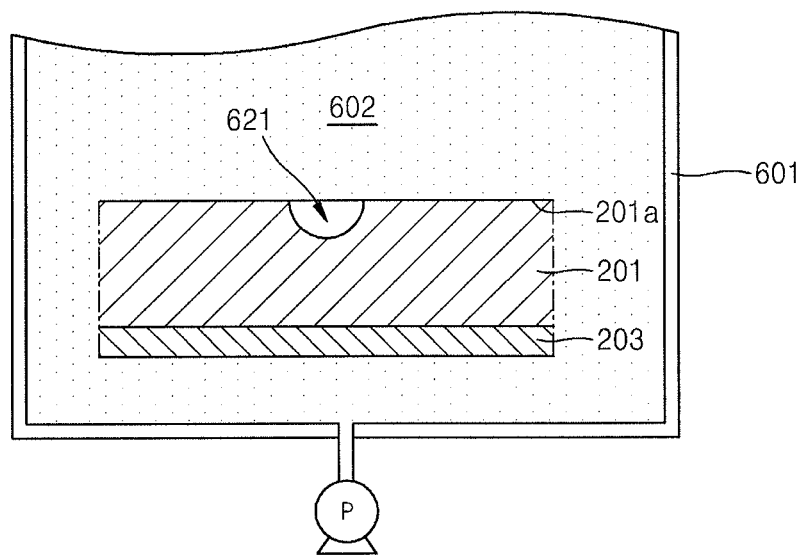
FIGS. 6A and 6B illustrate sectional views of stages in a method of using a gaseous filling according to an embodiment, where
Figure 6B:
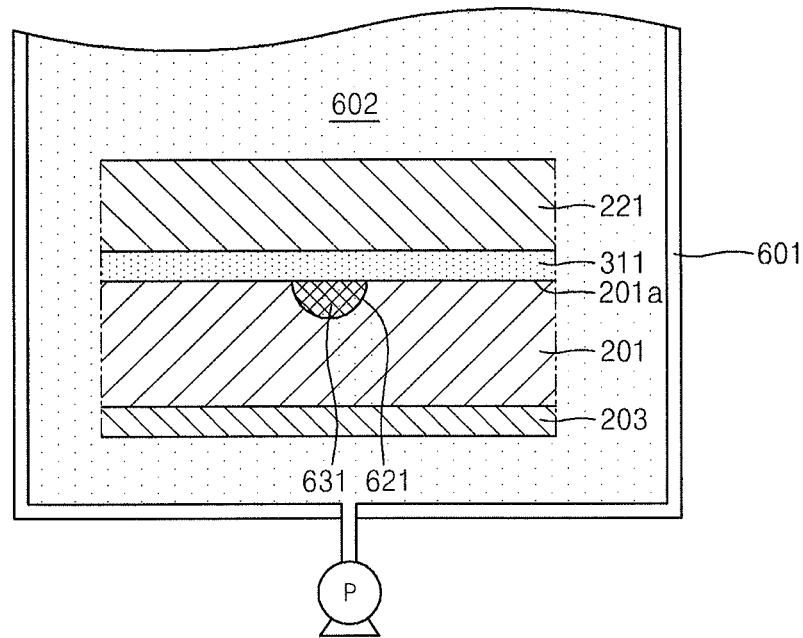

Although FIGS. 6A and 6B illustrate only the first substrate 201 in which defect holes 621 are formed, the first substrate 201 and the second substrate 202 may actually be combined and corresponding structures may perform the same or similar functions.

As illustrated in FIG. 6A, when using a gaseous raw material, the first substrate 201, on which the function layer 203 is formed, may be located in a process chamber 601. Here, the process chamber 601 may have an internal atmosphere that contains a gas or a mixture of more than one gas. In an implementation, the internal atmosphere of the process chamber 601 may include $CO_2$ gas 602. The $CO_2$ gas 602 may be used as a raw material for the gaseous filling 631. Since the first substrate 201 may be located in the process chamber 601, the $CO_2$ gas 602 may partially exist in the defect holes 621.

Here, the $CO_2$ gas 602 in the process chamber 601 may have a refractive index of about 1.63, which is about 90% to about 110% (i.e., about 108.7%) of the refractive index of the first substrate 201.

Next, as illustrated in FIG. 6B, the first polarization film 221, which may function as a cover member, may be coupled to the first surface 201a of the first substrate 201 via the adhesive 311. Therefore, the defect holes 621 filled with the gaseous filling 621 may be covered by the first polarization film 211.

Operations of the liquid crystal display device 200 having the structure as described above will be described below.

Referring to FIG. 2, a potential difference may be generated between the first electrode 213 and the second electrode 216 due to an external signal controlled by the gate electrode 207, the source electrode 209, and the drain electrode 229. The liquid crystal layer 219 may be aligned according to the potential difference and light provided by the backlight unit 260 may be either blocked or transmitted based on the alignment of the liquid crystal layer 219. Transmitted light may gain colors as it passes through the color filter layer 215 and may form an image.

Here, as illustrated in FIG. 3, the plurality of dimple-type defect holes 321 may occur on the first surface 201a of the first substrate 201 or the surface opposite to the first surface 202a of the second substrate 202 during preparation of the substrates 201 and 202 or preparations of the first function layer 203 and the second function layer 214. The defect holes 321 may be filled with the liquid filling 331 or the gaseous filling 331.

The refractive index of the filling 331 may be about 90% to about 110% of the refractive index of the first substrate 201 or the second substrate 202. In an implementation, the refractive index of the filling 331 may be identical to the refractive index of the first substrate 201 and/or the second substrate 202. Therefore, diffused-reflection of light due to refractive index deviation in portions including the defect holes 321 may be prevented.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display device, comprising:
    a liquid crystal display panel, the liquid crystal display panel including substrates facing each other and a liquid crystal layer therebetween;
    a backlight unit below the liquid crystal display panel, the backlight unit being for emitting light toward the liquid crystal display panel;
    a filling that fills defect holes on surfaces of the substrates, which surfaces are relatively remote from the liquid crystal layer, the filling having horizontally even surfaces with respect to the surfaces of the substrates and being a hardened acrylic filling, and
    a cover member disposed over the defect holes filled with the filling, the cover member being between the backlight unit and the liquid crystal display panel.

2. The liquid crystal display device as claimed in claim 1, where a refractive index of the filling is about 90% to about 110% of a refractive index of each of the substrates.

3. The liquid crystal display device as claimed in claim 1, where the cover member includes a polarization film coupled to the substrates via an adhesive.

4. A method of manufacturing a liquid crystal display device including a liquid crystal layer between a pair of substrates, the method comprising:
    filling defect holes on surfaces of the substrates with a liquid acrylic raw material, which surfaces are relatively remote from the liquid crystal layer, such that filling the defect holes includes filling the defect holes with the liquid acrylic raw material by using a squeegee; and
    hardening the liquid acrylic raw material to create horizontally even surfaces thereof with respect to the surfaces of the substrates.

5. The method as claimed in claim 4, wherein:
    hardening the liquid acrylic raw material includes irradiating an ultraviolet ray thereto.

6. The method as claimed in claim 4, wherein filling the defect holes includes injecting the liquid acrylic raw material into the defect holes by using a dispenser with a diameter smaller than diameters of the defect holes; and
    hardening the liquid filling includes hardening the acrylic raw material.

7. The method as claimed in claim 4, further comprising polishing the hardened acrylic raw material.

8. The method as claimed in claim 4, wherein a refractive index of the liquid acrylic raw material is about 90% to about 110% of a refractive index of each of the substrates.

9. The method as claimed in claim 4, further comprising coupling a polarization film to the substrates having the filled defect holes via an adhesive.

10. A method of manufacturing a liquid crystal display device including a liquid crystal layer between a pair of substrates, the method comprising:
    filling defect holes on surfaces of the substrates with a gaseous filling, which surfaces are relatively remote from the liquid crystal layer; and
    coupling a cover member to the substrate over the filled defect holes.

11. The method as claimed in claim 10, wherein filling the defect holes on the substrates includes placing the substrates in a process chamber including the gaseous filling.

12. The method as claimed in claim 10, wherein a refractive index of the gaseous filling is about 90% to about 110% of a refractive index of each of the substrates.

13. The method as claimed in claim 10, wherein the gaseous filling includes carbon dioxide gas.

14. The method as claimed in claim 10, where the cover member includes a polarization film and coupling the polarization film to the substrate includes coupling with an adhesive.

15. A liquid crystal display device, comprising:
- a liquid crystal display panel, the liquid crystal display panel including substrates facing each other and a liquid crystal layer therebetween;
- a backlight unit below the liquid crystal display panel, the backlight unit being for emitting light toward the liquid crystal display panel;
- a filling that fills defect holes on surfaces of the substrates, which surfaces are relatively remote from the liquid crystal layer, the filling having horizontally even surfaces with respect to the surfaces of the substrates, and
- a cover member disposed over the defect holes filled with the filling,
- wherein the filling is gaseous.

16. The liquid crystal display device as claimed in claim 15, wherein the gaseous filling includes carbon dioxide gas.

17. The liquid crystal display device as claimed in claim 15, where a refractive index of the filling is about 90% to about 110% of a refractive index of each of the substrates.

18. The liquid crystal display device as claimed in claim 15, where the cover member includes a polarization film coupled to the substrates via an adhesive.

* * * * *